United States Patent
Cavalier et al.

(10) Patent No.: US 7,847,002 B2
(45) Date of Patent: Dec. 7, 2010

(54) COATED PARTICLES OF CALCIUM CARBONATE HAVING A HIGH SPECIFIC SURFACE

(75) Inventors: Karine Cavalier, Arles (FR); Didier Sy, Salin de Giraud (FR); Roberto Rosa, Ranco (IT)

(73) Assignee: Solvay (Societe Anonyme), Brussels (BE)

( * ) Notice: Subject to any disclaimer, the term of this patent is extended or adjusted under 35 U.S.C. 154(b) by 251 days.

(21) Appl. No.: 11/719,154

(22) PCT Filed: Nov. 9, 2005

(86) PCT No.: PCT/EP2005/055870

§ 371 (c)(1),
(2), (4) Date: May 11, 2007

(87) PCT Pub. No.: WO2006/051087

PCT Pub. Date: May 18, 2006

(65) Prior Publication Data

US 2009/0099285 A1    Apr. 16, 2009

(30) Foreign Application Priority Data

Nov. 12, 2004  (EP) .................................. 04105748

(51) Int. Cl.
*C08K 5/00* (2006.01)
*C08K 3/26* (2006.01)

(52) U.S. Cl. ...................... 524/174; 524/425

(58) Field of Classification Search ................... 524/174
See application file for complete search history.

(56) References Cited

U.S. PATENT DOCUMENTS

| | | | | |
|---|---|---|---|---|
| 4,026,991 | A * | 5/1977 | Chamberlain | 423/177 |
| 4,274,987 | A * | 6/1981 | Augustyn | 524/425 |
| 4,927,618 | A * | 5/1990 | Mathur et al. | 423/432 |
| 5,118,738 | A | 6/1992 | Berthet et al. | |
| 2004/0092639 | A1* | 5/2004 | Kasahara et al. | 524/425 |
| 2004/0166047 | A1 | 8/2004 | Vogels et al. | |
| 2006/0042511 | A1* | 3/2006 | Craig | 106/447 |
| 2007/0142527 | A1 | 6/2007 | Rosa et al. | |

FOREIGN PATENT DOCUMENTS

| | | |
|---|---|---|
| CN | 1210751 | 3/1999 |
| EP | 0 323 697 | 7/1989 |
| EP | 0 522 415 | 1/1993 |
| EP | 522415 A1 * | 1/1993 |
| FR | 2 138 300 | 1/1973 |
| FR | 2 480 771 | 10/1981 |
| GB | 2 269 992 | 3/1994 |
| JP | 53089839 | 8/1978 |
| JP | 58059901 | 4/1983 |
| JP | 59001571 | 1/1984 |
| JP | 59191764 | 10/1984 |
| JP | 61115971 | 6/1986 |
| JP | 06 293866 | 10/1994 |
| JP | 07 242826 | 9/1995 |
| JP | 2002 309125 | 10/2002 |
| WO | 03 004414 | 1/2003 |
| WO | 2005 047372 | 5/2005 |
| WO | 2006 045768 | 5/2006 |
| WO | 2006 067144 | 6/2006 |
| WO | 2006 087312 | 8/2006 |
| WO | 2006 134080 | 12/2006 |
| WO | 2007 009971 | 1/2007 |
| WO | 2007 014878 | 2/2007 |
| WO | 2007 039625 | 4/2007 |

OTHER PUBLICATIONS

U.S. Appl. No. 11/995,885, filed Jul. 17, 2006, Lefevre, et al.
U.S. Appl. No. 12/089,130, filed Oct. 4, 2006, Lefevre, et al.
Macipe, A. L. et al., "Calcium Carbonate Precipitation from Aqueous Solutions Containing Aerosol OT", Journal of Crystal Growth, vol. 166, pp. 1015-1019, 1996.
U.S. Appl. No. 11/666,090, filed Apr. 24, 2007, Ricaud, et al.
U.S. Appl. No. 11/722,269, filed Jun. 20, 2007, Cavalier, et al.
U.S. Appl. No. 11/816,326, filed Aug. 15, 2007, Cavalier, et al.

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

The present invention relates to particles of an alkaline earth metal carbonate which are at least partially coated with at least one coating agent and which have a specific surface of more than $50\ m^2g^{-1}$ before coating. Preferably, the alkaline earth metal is calcium and the coating agent comprises a compound selected from the group consisting of organic sulfonic acids, alkylsulfates, fatty acids and the salts thereof.

18 Claims, No Drawings

COATED PARTICLES OF CALCIUM CARBONATE HAVING A HIGH SPECIFIC SURFACE

This application is a 371 of PCT/EP05/55870 filed Nov. 9, 2005.

The invention relates to coated particles of an alkaline earth metal carbonate, preferably $CaCO_3$, which are at least partially coated with at least one coating agent and have a specific surface of more than 50 $m^2g^{-1}$ before coating. The invention also relates to the production of such particles and their use.

Calcium carbonate is used as a filler material in paintings, rubber, paper, pharmacy, plastics and so on. Such calcium carbonate is obtained from natural deposits, thereafter being finely ground, or is obtained via chemical precipitation and drying of the precipitate. It is also known that the dispersibility of fillers in a polymeric matrix widely varies, depending upon the particle size of the filler, and characteristically decreases with diminishing particle sizes; thus, to utilize very finely divided particulates in polymeric matrices, it is necessary to extend the mixing times or the shearing effectiveness of the mixer. This is counterproductive when heat-sensitive polymers are used, because any improvement in the mechanical properties due to the filler content is lost because of concomitant thermal degradation of the polymer.

Different solutions have been proposed to overcome the lack of affinity of calcium carbonate to materials which are essentially oleophilic, such as the typical natural and synthetic polymers. It is known to modify the surfaces of filler particles by treating them with a solution of polymer in solvent and then drying the treated particles; other known processes involve the preliminary treatment of the particulate filler with monomers, followed by polymerization thereof, and a third type of process features the fixation on the surfaces of the filler particles of oleophilic compounds, such as fatty acids. Finally, yet another category of process features the treatment of a calcareous filler to improve its wettability by means of hydrocarbons and plastic materials by contacting the same with alkylarylsulfonic acids or salts, the calcium salt thereof being essentially insoluble in water, in an amount at least equal to that required to form a monomolecular layer or a coating covering the entire surface of the particles or grains, as described in FR-A 2 138 300. This publication specifically relates to calcium carbonate powders having a low specific surface, on the order of 0.5 to 3 $m^2/g$ (BET method). FR-A 2 480 771 discloses the treatment of calcium carbonate powder with an organic sulfonic acid or salt thereof, together with a fatty acid compound. The beginning calcium carbonate has a specific surface, measured by the BET method, between 50 $m^2/g$ and 0.2 $m^2/g$.

Calcium carbonate can also be used as filler material in plastisols. Plastisols are dispersions of polymers, often comprising polyvinyl chloride (PVC) in organic solvents having high boiling points and usually containing softeners and stabilizers. Plastisols are useful e.g. for coating metals and other substrates, such as underbody sealants for automobiles, for preparing artificial leather, etc. Polyvinyl chloride plastisols offer several advantages for use as sealant compositions: a good balance of strength, elongation and toughness, minimal to no volatile organic component and low cost.

When a plastisol is intended for application by means of a spray gun, it should adhere to the substrate and form a smooth film thereon. Flowing and any movement of the film due to gravitational forces should be suppressed as long as the plastisol is liquid or pasty, i.e. before it is cured. This kind of adhesion can be achieved by modifying the rheological properties of the plastisol.

However, the plastisols known from the prior art are not satisfactory in every respect.

When being applied to a substrate by means of a spray gun, a good plastisol should exhibit a high viscosity when the shearing force is low and a low viscosity when the shearing force is high. Furthermore, it should be characterized by a high yield stress and good thixotropic properties.

Thus, it is an object of the present invention to provide a filler material which has advantages over the filler materials of the prior art. In particular, the filler material should be suitable for plastisols which may be applied by a spray gun, i.e. a plastisol containing said filler material should have a high yield stress, it should exhibit a high viscosity when the shearing force is low and a low viscosity when the shearing force is high. Furthermore, these properties should be constant for a certain period of time.

It has been surprisingly found that in comparison to plastisols containing conventional calcium carbonate particles the yield stress of a plastisol can be increased by a factor of 5 to 10 (or even more), when it contains particles of an alkaline earth metal carbonate which have a specific surface of more than 50 $m^2g^{-1}$ before coating and which are at least partially coated with at least one coating agent.

Plastisols containing the particles according to the present invention show excellent rheological properties, particularly high yield stress values, good viscosities and thixotropy.

The particles according to the invention have a specific surface of more than 50 $m^2g^{-1}$ before coating, preferably more than or equal to 55 $m^2/g$, still more preferably above or equal to 60 $m^2/g$ and most preferably above or equal to 65 $m^2/g$ before coating. Values of the specific surface of the particles before coating higher than or equal to 70 $m^2/g$, specifically higher than or equal to 75 $m^2/g$ and more specifically higher than or equal to 80 $m^2/g$ are particularly convenient. The particles have usually a specific surface lower than or equal to 300 $m^2/g^{-1}$, more preferably lower than or equal to 180 $m^2g^{-1}$ and most preferably lower than or equal to 105 $m^2g^{-1}$ before coating.

Such particles of precipitated calcium carbonate are known in the prior art and may be prepared by precipitating calcium carbonate particles from a suspension of $Ca(OH)_2$ in the presence of an agent such as citric acid, polyacrylic acid, sodium dioctylsulfosuccinate and polyaspartic acid. In this regard it can be referred to e.g. WO 03/004414 the disclosure of which being incorporated herein.

For the purpose of the specification, the specific surface of a precipitated calcium carbonate particle before coating is defined as the surface area which is determined according to the BET-method (adsorption isotherm of nitrogen according to Brunnauer-Emmett-Teller (BET)). According to the BET-method the surface of a powder can be calculated from the $N_2$-isotherm, which is observed at the boiling point of liquid nitrogen. For details, it can be referred to the ISO 9277 norm (1995-05-15).

In a preferred embodiment of the present invention the particles of an alkaline earth metal carbonate is calcium carbonate or magnesium carbonate, calcium carbonate being particularly preferred.

The particles according to the invention are coated with a coating agent. Several coating agents are suitable for that purpose.

Preferably, the coating agent comprises at least a compound selected from the group consisting of organic sulfonic acids; alkylsulfates; fatty acids, optionally substituted with a hydroxy group (i.e. hydroxy fatty acids); and the salts thereof.

More preferably, the coating agent comprises at least a compound selected from the group consisting of organic sulfonic acids; alkylsulfates; hydroxy fatty acids and the salts thereof and fatty acids.

Still more preferably, the coating agent comprises at least a compound selected from the group consisting of organic sulfonic acids, alkylsulfates, hydroxy fatty acids and the salts thereof.

Most preferably, the coating agent comprises at least a compound selected from the group consisting of organic sulfonic acids; alkylsulfates and the salts thereof.

For the purpose of the specification, the term "organic sulfonic acids" encompasses any compound bearing at least one group —$SO_3H$ or a salt thereof and at least 1 carbon atom. Thus, organic sulfonic acids may contain further functional groups, such as esters. Particularly, organic sulfonic acids encompass alkylsulfosuccinates such as dioctylsulfosuccinate and its sodium salt.

For the purpose of the specification, the term "alkyl" denotes, if not otherwise specified, linear or branched alkyl chains, preferably having 1 to 30, more preferably 1 to 18, most preferably 1 to 12 and in particular 1 to 6 carbon atoms, such as methyl, ethyl, n-propyl, i-propyl, n-butyl, sec-butyl, iso-butyl, tert-butyl, n-pentyl, i-pentyl, n-hexyl, i-hexyl, n-heptyl, i-heptyl, n-octyl, i-octyl, n-nonyl, i-nonyl, n-decyl, i-decyl, n-undecyl, i-undecyl, n-dodecyl, i-dodecyl and the like.

In a preferred embodiment of the present invention the coating agent comprises at least a fatty acid, optionally substituted with a hydroxy group. Suitable fatty acids are linear or branched aliphatic carboxylic acids, preferably having 8 to 22 carbon atoms, more preferably 12 to 18 and in particular 16 to 18 carbon atoms, and the salts thereof. The aliphatic chains of the fatty acids may be saturated or unsaturated. Saturated aliphatic fatty acids are preferred. Preferably, the coating agent comprises stearic acid or its salts. Stearic acid is more preferred. When the coating agent comprises a hydroxy fatty acid or a salt thereof, hydroxy stearic acid is preferred. Most preferably, the stearic acid bears the hydroxy group in 12-position ($CH_3$—$(CH_2)_4$—$CH_2$—CHOH—$CH_2$—$(CH_2)_8$—$CH_2$—COOH).

Advantageously, the precipitated calcium carbonate particles having a specific surface of more than 50 $m^2g^{-1}$ before coating are directly treated, either with the fatty acids or hydroxy fatty acids themselves, or with the alkali metal or ammonium salts thereof. Usually, for ease of handling and to ensure the homogeneity of the ultimate product, aqueous solutions or suspensions of a salt of the fatty acid or hydroxy fatty acid are utilized as the means for effecting the subject surface treatment.

In another preferred embodiment of the present invention the coating agent comprises at least a sulfur organic compound. Preferably, the coating agent comprises a compound selected from the group consisting of alkylsulfonic acids, arylsulfonic acids, alkylarylsulfonic acids, alkylsulfosuccinates, alkylsulfates and the salts thereof.

For the purpose of the specification, the term "aryl" denotes an aromatic mono- or bicyclic hydrocarbon comprising 6 to 10 carbon atoms, such as phenyl and naphthyl, optionally substituted with halogen.

For the purpose of the specification, the term "alkylaryl" denotes an "alkyl" residue as defined above covalently linked to an "aryl"-residue as defined above, such as —$CH_2C_6H_5$, —$CH_2CH_2C_6H_5$, —$CH_2CH_2CH_2C_6H_5$, and the like.

In a preferred embodiment the coating agent comprises a compound represented by general formula (I-A) or (I-B)

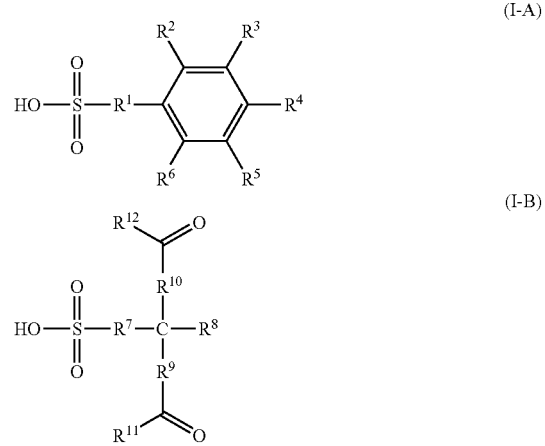

wherein $R^1$, $R^7$, $R^9$ and $R^{10}$ are independently a single bond, —O—, —$C_1$-$C_{18}$-alkylene- or —$C_2$-$C_{18}$-alkenylene- (wherein in the alkylene- or in the alkenylene-chain optionally 1, 2 or 3 —$CH_2$— groups may be replaced by —O—);

$R^2$, $R^3$, $R^4$, $R^5$ and $R^6$ are independently —H, —$C_1$-$C_{18}$-alkyl (wherein in the alkyl-chain optionally 1, 2 or 3 —$CH_2$— groups may be replaced by —O—), —OH, —F, —Cl, —CN, —$CO_2H$, —CO—$C_1$-$C_6$-alkyl, —$CO_2$—$C_1$-$C_6$-alkyl, —O—CO—$C_1$-$C_6$-alkyl, —$NO_2$, —$NH_2$, —NH—$C_1$-$C_6$-alkyl or —N($C_1$-$C_6$-alkyl)$_2$;

$R^8$ is —H or —$C_1$-$C_6$-alkyl; and $R^{11}$ and $R^{12}$ are independently —H, —$C_1$-$C_{18}$-alkyl (wherein in the alkyl-chain optionally 1, 2 or 3 —$CH_2$— groups may be replaced by —O—), —$NH_2$, —NH—$C_1$-$C_6$-alkyl or —N($C_1$-$C_6$-alkyl)$_2$.

For the purpose of the specification, the term "alkylene" denotes bivalent linear or branched alkylene chains, such as —$CH_2$—, —$CH_2CH_2$—, —$CH_2CH_2CH_2$—, —$CH_2CH_2CH_2CH_2$—, —CH($CH_3$)—, —$CH_2$CH($CH_3$)—, —$CH_2CH_2$CH($CH_3$)—, —$CH_2$CH($CH_3$)$CH_2$—, and the like.

For the purpose of the specification, the term "alkenylene" denotes bivalent linear or branched alkenylene chains, such as —CH═CH—, —$CH_2$CH═CH—, —$CH_2CH_2$CH═CH—, —CH═C($CH_3$)—, —$CH_2$CH═C($CH_3$)—, —CH═C($CH_3$)$CH_2$—, and the like.

Preferably, in the compound represented by general formula (I-A) or (I-B) $R^1$, $R^7$, $R^9$ and $R^{10}$ are independently a single bond or —$C_1$-$C_6$-alkylene- (wherein in the alkylene-chain optionally 1 or 2 —$CH_2$— groups may be replaced by —O—);

$R^2$, $R^3$, $R^4$, $R^5$ and $R^6$ are independently —H or —$C_1$-$C_{18}$-alkyl (wherein in the alkyl-chain optionally 1, 2 or 3 —$CH_2$— groups may be replaced by —O—);

$R^8$ is —H or —$C_1$-$C_6$-alkyl; and $R^{11}$ and $R^{12}$ are independently —$C_1$-$C_{12}$-alkyl (wherein in the alkyl-chain optionally 1, 2 or 3 —$CH_2$— groups may be replaced by —O—).

More preferably, in the compound represented by general formula (I-A) or (I-B)

$R^1$ and $R^7$ are a single bond;

$R^2$, $R^3$, $R^5$ and $R^6$ are —H $R^4$ is —H or —$C_1$-$C_6$-alkyl;

$R^8$ is —H;

$R^9$ and $R^{10}$ are independently a single bond or —$CH_2$—; and $R^{11}$ and $R^{12}$ are independently —$C_1$-$C_{12}$-alkoxy.

For the purpose of the specification, the term "alkoxy" denotes an "alkyl" residue as defined above covalently linked to an oxygen atom, such as —$OCH_3$, —$OCH_2CH_3$, and the like.

Most preferably, the coating agent comprises one or more compounds selected from the group consisting of benzene sulfonic acid, toluene sulfonic acid, dioctylsulfosuccinate and the salts thereof.

The inventors of the present invention have also found that when the coating agent comprises a compound of formula (I-A), wherein $R^1$ is a single bond, $R^2$, $R^3$, $R^5$ and $R^6$ are —H; and $R^4$ is —H or —$C_1$-$C_{10}$-alkyl, preferably —H or —$C_1$-$C_6$-alkyl; coated particles exhibiting excellent properties may also be obtained with precipitated calcium carbonate having a specific surface of 50 $m^2g^{-1}$ or below 50 $m^2g^{-1}$ before coating. Preferably, the coating agent comprises benzene sulfonic acid or toluene sulfonic acid. In this embodiment, the specific surface of the calcium carbonate particles is preferably within the range of from 25 to 50 $m^2g^{-1}$, more preferably from 30 to 50 $m^2g^{-1}$, most preferably from 35 to 50 $m^2g^{-1}$ and in particular from 40 to 50 $m^2g^{-1}$ before coating. Alternatively, however, the specific surface may also be above 50 $m^2g^{-1}$ before coating, more preferably above or equal to 55 $m^2/g$, still more preferably above or equal to 60 $m^2/g$ and most preferably above or equal to 65 $m^2/g$ before coating. Values of the specific surface of the particles before coating higher than or equal to 70 $m^2/g$, specifically higher than or equal to 75 $m^2/g$ and more specifically higher than or equal to 80 $m^2/g$ are particularly convenient, as described supra.

Preferably, the particles according to invention have an average primary particle size within the range of from 0.1 to 30 nm. The primary particle size relates to the coated particles and the condition in which substantially no agglomerates are formed. The primary particle size ($d_P$) may be determined according to the method described in NFX 11601 (1974)/11602 NFX (1977). More specifically, the average size of the primary particles is measured by the Léa and Nurse method (Standard NFX 11-601, 1974). The $d_P$ value is obtained from the massic area ($S_M$) derived from the Léa and Nurse method by making the assumptions that all the particles are spherical, non porous and of equal diameter, and by neglecting contact surfaces between the particles. The relationship between $d_P$ and $S_M$ is the following:

$$d_P = 6/(\rho S_M)$$

where $\rho$ is the specific mass of the calcium carbonate.

More preferably, the average primary particle size is within the range of from 1 to 30 nm.

The present invention also relates to compositions comprising the coated particles described above and a polymer. Preferably, the polymer comprises polyvinyl chloride. In a preferred embodiment, the polymer has an weight average molecular weight $M_w$ within the range of from 5,000 to 500,000 $gmol^{-1}$, more preferably 10,000 to 400,000 $gmol^{-1}$, most preferably 25,000 to 250,000 $gmol^{-1}$.

Preferably, the compositions according to the invention contain
- the coated particles according to the invention;
- at least one polymer, such as polyvinyl chloride (PVC), e.g. Vestolit, Vinolit,
- optionally at least one plasticizer, such as di-octylphtalate (DOP), di-isononylphtalate (DINP), Adipate, Sebacate
- Optionally at least one solvent, such as derivatives of hydrocarbons
- optionally at least one filler, such as $TiO_2$, $SiO_2$, Natural Calcium Carbonate
- optionally at least one promoter, such as Polyamines, Polyamides
- optionally at least one desiccant, such as CaO and
- optionally further additives.

Preferred embodiments of the compositions according to the invention are summarized here below:

TABLE 1

| [wt.-%] | preferably | more preferably | most preferably |
|---|---|---|---|
| coated particles | 1-50 | 5-30 | 15-25 |
| polymer | 5-75 | 15-50 | 25-35 |
| plasticizer | 10-60 | 20-50 | 30-40 |
| Solvent | 0.5-15 | 1-10 | 3-6 |
| filler | 0-30 | 0-20 | 0-16 |
| promoter | 0-20 | 0-10 | 1-6 |
| desiccant | 0-20 | 0-10 | 1-2 |
| further additives | 0-15 | 0-10 | 0-5 |

The present invention also relates to a process for the preparation of coated particles as described above comprising the step of contacting uncoated particles of an alkaline earth metal carbonate having a specific surface of more than 50 $m^2g^{-1}$ with a coating agent.

Preferably, the coating agent comprises one or more of the preferred compounds as described above.

In a preferred embodiment, the process comprises the steps of
(a) precipitating calcium carbonate particles from a suspension of calcium hydroxide under conditions providing a specific surface of more than 50 $m^2g^-$; and
(b) contacting the particles of calcium carbonate obtained from step (a) with the coating agent.

The present invention also relates to the use of the coated particles as described above as filler in polymeric compositions.

The following examples further illustrate the invention but are not to be construed as limiting its scope.

EXAMPLE 1

Particles of calcium carbonate having a specific surface ranging from 41 to 104 $m^2g^{-1}$ (before coating) were obtained according to the method described in WO 03/004414.

These precipitated calcium carbonate particles were coated with a coating agent selected from Marlon, AOT, stearic acid and hydroxystearine. "Marlon" is a mixture comprising 85 wt.-% benzenesulfonic acid and 15 wt.-% toluenesulfonic acid sodium salt and "AOT" means dioctylsulfosuccinate sodium salt. To apply the coating agent to the precipitated calcium carbonate particles, a solution or emulsion of the coating agent was added. When the coating was applied in form of a solution, the coating agent was added to a slurry of precipitated calcium carbonate at room temperature and agitated for 30 minutes before being filtered and dried in an oven. When the coating was applied in form of an emulsion, the coating agent was added to a slurry of precipitated calcium carbonate at 75-85° C. and agitated for 30 minutes before being filtered and dried.

The properties of the particles (type-0 to type-12) are summarized in Table 2 here below and are compared with ultrafine precipitated calcium carbonate coated with stearine (a mixture of saturated and unsaturated branched aliphatic carboxylic acids e.g. Priplus, Edenor, Pristerene, Undesa, Prifrac, Radiacid, Safacid, Cremer) as coating agent and having a specific surface of 20 $m^2g^{-1}$ before coating.

TABLE 2

| particle | specific surface (before coating) | coating agent |
|---|---|---|
| Reference | 20 $m^2g^{-1}$ | stearin |
| type-1 | 41 $m^2g^{-1}$ | Marlon |
| type-2 | 66 $m^2g^{-1}$ | Marlon |
| type-3 | 70 $m^2g^{-1}$ | Marlon |
| type-4 | 85 $m^2g^{-1}$ | Marlon |
| type-5 | 70 $m^2g^{-1}$ | AOT |
| type-6 | 70 $m^2g^{-1}$ | AOT |
| type-7 | 85 $m^2g^{-1}$ | AOT |
| type-8 | 53 $m^2g^{-1}$ | stearin |
| type-9 | 77 $m^2g^{-1}$ | stearin |
| type-10 | 104 $m^2g^{-1}$ | stearin |
| type-11 | 70 $m^2g^{-1}$ | hydroxystearin |
| type-12 | 70 $m^2g^{-1}$ | hydroxystearin |

EXAMPLE 2

Two different formulations were prepared containing polyvinyl chloride and the coated calcium carbonate particles of Example 1. The composition of said formulations is summarized in Table 3 here below.

TABLE 3

| formulation | A [g] | B [g] |
|---|---|---|
| Plasticizer | 114.7 | 105 |
| Polymer | 90.1 | 75 |
| Solvent | 13.8 | 12 |
| Filler | 0.3 | 50.1 |
| Other additives | 0.3 | 0.9 |
| Batch Σ | 219.2 | 243.0 |
| coated precipitated calcium carbonate | | |
| 100% | 73.5 | 48.0 |
| 75% | 55.1 | 36.0 |
| 65% | 47.8 | 31.2 |
| 50% | 36.8 | 24.0 |
| Promoter | 4.0 | 3.0 |
| Desiccant | 3.3 | 6.0 |

EXAMPLE 3

The rheological properties of the various formulations obtained from Example 2 were investigated according to the ISO 3219 norm. The measurements were performed in a rheometer type UDS 200 equipped with a mobile DIN 125 conical cylinder. This rheometer measures the development of the shearing forces and the viscosity in function of the velocity gradient imposed. All measurements were performed at 25° C. according to the following procedure:

Keeping the probe at 25° C. for 5 minutes until a thermal equilibrium has been reached Accelerating from 0 to 100 $s^{-1}$ over 2 minutes measuring 120 data points Keeping 1 minute at 100 $s^{-1}$ measuring 20 data points Decelerating from 100 to 0 $s^{-1}$ over 2 minutes measuring 120 data points.

As indicated in Table 2, the content of the coated precipitated calcium carbonate particles in the formulations was varied (100%, 75%, 65% and 50%).

The formulations were tested 1 day after their preparation. The examples of the rheological tests are summarized in Tables 4 to 14 here below:

TABLE 4

| formulation A coating with Marlon | | yield stress [Pa] | viscosity [Pa s] | thixotropy [Pa $s^{-1}$] |
|---|---|---|---|---|
| Reference | 100% | 174 | 3.3 | 1719 |
| type-1 (41 $m^2g^{-1}$) | 100% | 243 | 4.5 | 3720 |
| after 1 day | 75% | 427 | 6.5 | 16291 |
| | 65% | 90 | 2.2 | 1300 |
| | 50% | 29 | 1.2 | 941 |

TABLE 5

| | | yield stress [Pa] | viscosity [Pa s] | thixotropy [Pa $s^{-1}$] |
|---|---|---|---|---|
| formulation A coating with Marlon | | | | |
| Reference | 100% | 174 | 3.3 | 1719 |
| type-2 (66 $m^2g^{-1}$) | 100% | NM | NM | NM |
| after 1 day | 75% | 362 | 5.4 | 7269 |
| | 65% | 221 | 3.4 | 2655 |
| | 50% | 102 | 2.0 | 1541 |
| formulation B coating with Marlon | | | | |
| Reference | 100% | 153 | 3.7 | 4543 |
| type-2 (66 $m^2g^{-1}$) | 100% | NM | NM | NM |
| after 1 day | 75% | 459 | 6.5 | 15750 |
| | 65% | 321 | 5.1 | 7817 |
| | 50% | 153 | 3.0 | 3304 |

TABLE 6

| | | yield stress [Pa] | viscosity [Pa s] | thixotropy [Pa $s^{-1}$] |
|---|---|---|---|---|
| formulation A coating with Marlon | | | | |
| Reference | 100% | 174 | 3.3 | 1719 |
| type-3 (70 $m^2g^{-1}$) | 100% | NM | NM | NM |
| after 1 day | 75% | 377 | 5.2 | 21054 |
| | 65% | 277 | 3.8 | 7785 |
| | 50% | 107 | 2.0 | 4012 |
| formulation B coating with Marlon | | | | |
| Reference | 100% | 153 | 3.7 | 4543 |
| type-3 (70 $m^2g^{-1}$) | 100% | NM | NM | NM |
| after 1 day | 75% | 541 | 6.8 | 17511 |
| | 65% | 277 | 5.2 | 17480 |
| | 50% | 188 | 3.1 | 7583 |

TABLE 7

| formulation B coating with Marlon | | yield stress [Pa] | viscosity [Pa s] | thixotropy [Pa s$^{-1}$] |
|---|---|---|---|---|
| Reference | 100% | 153 | 3.7 | 4543 |
| type-4 (85 m$^2$g$^{-1}$) | 100% | 206 | 5.8 | 11610 |
| after 1 day | 75% | 89 | 3.1 | 7236 |
| | 65% | 100 | 2.7 | 4907 |
| | 50% | 37 | 1.9 | 4634 |

TABLE 8

| | | yield stress [Pa] | viscosity [Pa s] | thixotropy [Pa s$^{-1}$] |
|---|---|---|---|---|
| formulation A coating with AOT | | | | |
| Reference | 100% | 174 | 3.3 | 1719 |
| type-5 (70 m$^2$g$^{-1}$) | 100% | NM | NM | NM |
| after 1 day | 75% | 368 | 5.0 | 5617 |
| | 65% | 250 | 3.6 | 2088 |
| | 50% | 93 | 1.8 | 1206 |
| formulation B coating with AOT | | | | |
| Reference | 100% | 153 | 3.7 | 4543 |
| type-5 (70 m$^2$g$^{-1}$) | 100% | NM | NM | NM |
| after 1 day | 75% | 481 | 7.0 | 7947 |
| | 65% | 285 | 4.5 | 6423 |
| | 50% | 157 | 3.1 | 4778 |

TABLE 9

| | | yield stress [Pa] | viscosity [Pa s] | thixotropy [Pa s$^{-1}$] |
|---|---|---|---|---|
| formulation A coating with AOT | | | | |
| Reference | 100% | 174 | 3.3 | 1719 |
| type-6 (70 m$^2$g$^{-1}$) | 100% | NM | NM | NM |
| after 1 day | 75% | 287 | 3.7 | 13266 |
| | 65% | 183 | 2.8 | 4352 |
| | 50% | 70 | 1.5 | 2190 |
| formulation B coating with AOT | | | | |
| Reference | 100% | 153 | 3.7 | 4543 |
| type-6 (70 m$^2$g$^{-1}$) | 100% | 669 | 8.5 | 37240 |
| after 1 day | 75% | 345 | 5.7 | 14138 |
| | 65% | 198 | 3.4 | 8053 |
| | 50% | 107 | 2.2 | 3804 |

TABLE 10

| | | yield stress [Pa] | viscosity [Pa s] | thixotropy [Pa s$^{-1}$] |
|---|---|---|---|---|
| formulation A coating with AOT | | | | |
| Reference | 100% | 174 | 3.3 | 1719 |
| type-7 (85 m$^2$g$^{-1}$) | 100% | NM | NM | NM |
| after 1 day | 75% | 498 | 4.4 | 5222 |
| | 65% | 298 | 4.1 | 3969 |
| | 50% | 123 | 2.2 | 1835 |
| formulation B coating with AOT | | | | |
| Reference | 100% | 153 | 3.7 | 4543 |
| type-7 (85 m$^2$g$^{-1}$) | 100% | NM | NM | NM |
| after 1 day | 75% | 670 | 8.8 | 4170 |
| | 65% | 468 | 6.3 | 1220 |
| | 50% | 169 | 3.2 | 5707 |

TABLE 11

| formulation B coating with stearin | | yield stress [Pa] | viscosity [Pa s] | thixotropy [Pa s$^{-1}$] |
|---|---|---|---|---|
| Reference | 100% | 153 | 3.7 | 4543 |
| type-8 (53 m$^2$g$^{-1}$) | 100% | 339 | 4.8 | 4862 |
| after 1 day | 75% | 139 | 2.5 | 3479 |

TABLE 12

| formulation B coating with stearin | | yield stress [Pa] | viscosity [Pa s] | thixotropy [Pa s$^{-1}$] |
|---|---|---|---|---|
| Reference | 100% | 153 | 3.7 | 4543 |
| type-9 (77 m$^2$g$^{-1}$) | 100% | 363 | 5.7 | 7624 |
| after 1 day | 75% | 141 | 3.0 | 5704 |

TABLE 13

| formulation B coating with stearin | | yield stress [Pa] | viscosity [Pa s] | thixotropy [Pa s$^{-1}$] |
|---|---|---|---|---|
| Reference | 100% | 153 | 3.7 | 4543 |
| type-10 (104 m$^2$g$^{-1}$) | 100% | 318 | 4.8 | 17324 |
| after 1 day | 75% | 207 | 2.5 | 11620 |

TABLE 14

| | | yield stress [Pa] | viscosity [Pa s] | thixotropy [Pa s$^{-1}$] |
|---|---|---|---|---|
| formulation A coating with hydroxystearin | | | | |
| Reference | 100% | 174 | 3.3 | 1719 |
| type-11 (70 m$^2$g$^{-1}$) | 100% | 280 | not measured | −1766 |
| after 1 day | | | | |
| formulation B coating with hydroxystearin | | | | |
| Reference | 100% | 153 | 3.7 | 4543 |
| type-11 (70 m$^2$g$^{-1}$) | 100% | 734 | 7.8 | 20596 |
| after 1 day | 75% | 285 | 4.1 | 6886 |
| | 65% | 168 | 2.9 | 7645 |
| | 50% | 100 | 2.1 | 3163 |

TABLE 15

| | | yield stress [Pa] | viscosity [Pa s] | thixotropy [Pa s$^{-1}$] |
|---|---|---|---|---|
| formulation A coating with hydroxystearin | | | | |
| Reference | 100% | 174 | 3.3 | 1719 |
| type-12 (70 m$^2$g$^{-1}$) | 100% | 694 | not measured | 1842 |
| after 1 day | | | | |

TABLE 15-continued

|  | | yield stress [Pa] | viscosity [Pa s] | thixotropy [Pa s$^{-1}$] |
|---|---|---|---|---|
| formulation B coating with hydroxystearin | | | | |
| Reference | 100% | 153 | 3.7 | 4543 |
| type-12 (70 m$^2$g$^{-1}$) | 100% | 539 | 8.7 | 34305 |
| after 1 day | 75% | 186 | 4.1 | 12444 |
|  | 65% | 106 | 3.4 | 8417 |
|  | 50% | 51 | 2.2 | 5950 |

Reference: Ultrafine coated precipitated calcium carbonate
NM: not measurable with the cylinder because of too high viscosity

The invention claimed is:

1. A particle of an alkaline earth metal carbonate which is at least partially coated with at least one coating agent and which has a specific surface area of more than 50 m$^2$g$^{-1}$ of the particle before coating, wherein the coating agent comprises at least one compound selected from the group consisting of fatty acids substituted with a hydroxy group and the salts thereof.

2. The particle according to claim 1, wherein the particle has a specific surface area of more than 65 m$^2$g$^{-1}$ of the particle before coating.

3. The particle according to claim 1, wherein the coating agent comprises one or more compounds selected from the group consisting of stearic acid substituted with a hydroxy group and the salts thereof.

4. The particle according to claim 1, wherein the particle has an average primary particle size within the range of from 0.1 ti 30 nm.

5. A composition comprising the particle according to claim 1 and at least one polymer.

6. A composition according to claim 5, wherein the polymer comprises polyvinyl chloride.

7. A process for the preparation of a coated particle comprising contacting an uncoated particle of an alkaline earth metal carbonate having a specific surface area of more than 50 m$^2$g$^{-1}$ of the particle with at least one coating agent, wherein the coating agent comprises at least a compound selected from the group consisting of fatty acids substituted with a hydroxy group and the salts thereof.

8. The process according to claim 7, wherein the alkaline earth metal carbonate is calcium carbonate, and said process further comprises precipitating the uncoated calcium carbonate particle from a suspension of calcium hydroxide under conditions providing a specific surface area of more than 50 m$^2$g$^{-1}$ of the particle prior to contacting with the at least one coating agent.

9. A method for producing a filled polymeric composition comprising adding the particle according to claim 1 as filler to a polymeric composition.

10. The particle according to claim 1, wherein the particle of the alkaline earth metal carbonate is a particle of calcium carbonate having a specific surface area of higher than or equal to 70 m$^2$g$^{-1}$ and lower than or equal to 180 m$^2$g$^{-1}$ before coating.

11. A particle of an alkaline earth metal carbonate which is at least partially coated with at least one coating agent and which has a specific surface area of more than 50 m$^2$g$^{-1}$ of the particle before coating,
wherein the particle of the alkaline earth metal carbonate is a particle of calcium carbonate having a specific surface area of higher than or equal to 70 m$^2$g$^{-1}$ and lower than or equal to 180 m$^2$g$^{-1}$ before coating, and
wherein the coating agent comprises at least one compound selected from the group consisting of fatty acids substituted with a hydroxy group and the salts thereof.

12. The particle according to claim 11, wherein the coating agent comprises at least a compound selected from the group consisting of hydroxy stearic acid and the salts thereof.

13. The particle according to claim 1, wherein the coating agent comprises at least a compound selected from the group consisting of fatty acids substituted with a hydroxy group.

14. A particle of an alkaline earth metal carbonate which is at least partially coated with at least one coating agent and which has a specific surface area of more than 50 m$^2$g$^{-1}$ of the particle before coating, wherein the coating agent comprises at least one compound selected from the group consisting of fatty acids substituted with a hydroxy group and the salts thereof, and wherein the particle has an average primary particle size within the range of from 0.1 to 30 nm.

15. The particle according to claim 14, wherein the coating agent comprises at least one compound selected from the group consisting of fatty acids substituted with a hydroxy group.

16. A composition comprising the particle according to claim 14 and at least one polymer.

17. The composition according to claim 16, wherein the polymer comprises polyvinyl chloride.

18. The particle according to claim 1, wherein the coating agent comprises at least a compound selected from the group consisting of salts of fatty acids substituted with a hydroxy group.

* * * * *